(12) United States Patent  
Eckert

(10) Patent No.: US 7,979,231 B2  
(45) Date of Patent: Jul. 12, 2011

(54) METHOD AND SYSTEM FOR ESTIMATION OF INERTIAL SENSOR ERRORS IN REMOTE INERTIAL MEASUREMENT UNIT

(75) Inventor: Charles P. Eckert, Palm Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 566 days.

(21) Appl. No.: 12/270,541

(22) Filed: Nov. 13, 2008

(65) Prior Publication Data

US 2010/0121601 A1 May 13, 2010

(51) Int. Cl.
*G06F 19/00* (2006.01)
*G01C 21/16* (2006.01)

(52) U.S. Cl. ........ 702/104; 702/105; 702/141; 702/142; 702/145; 702/150; 702/151; 702/152; 702/153; 702/154; 702/158; 701/220

(58) Field of Classification Search .................. 702/104, 702/105, 141, 142, 145, 150–154, 158; 701/220
See application file for complete search history.

(56) References Cited

U.S. PATENT DOCUMENTS

| | | | |
|---|---|---|---|
| 5,396,326 A | 3/1995 | Knobbe et al. | |
| 6,459,990 B1 | 10/2002 | McCall et al. | |
| 7,171,303 B1 | 1/2007 | Nordmark et al. | |
| 2005/0240347 A1 | 10/2005 | Yang | |
| 2007/0032951 A1* | 2/2007 | Tanenhaus et al. | 701/220 |
| 2007/0100550 A1 | 5/2007 | Hawkinson | |
| 2007/0240486 A1 | 10/2007 | Moore et al. | |

* cited by examiner

*Primary Examiner* — Sujoy K Kundu  
(74) *Attorney, Agent, or Firm* — Fogg & Powers LLC

(57) ABSTRACT

A method and system for estimation of inertial sensor errors is provided. The method includes receiving first inertial output data from a master inertial measurement unit (IMU) mounted on a host platform, with the first inertial output data comprising a change in velocity (delta V) and a change in angle (delta theta), and receiving second inertial output data from a remote IMU mounted on the host platform at a predetermined fixed distance from the master IMU, with the second inertial output data comprising a delta V and a delta theta. The first inertial output data is compared with the second inertial output data to determine a difference between the delta V of the first inertial output data and the delta V of the second inertial output data, and to determine a difference between the delta theta of the first inertial output data and the delta theta of the second inertial output data. The determined differences are applied to estimate inertial sensor errors in the remote IMU.

20 Claims, 1 Drawing Sheet

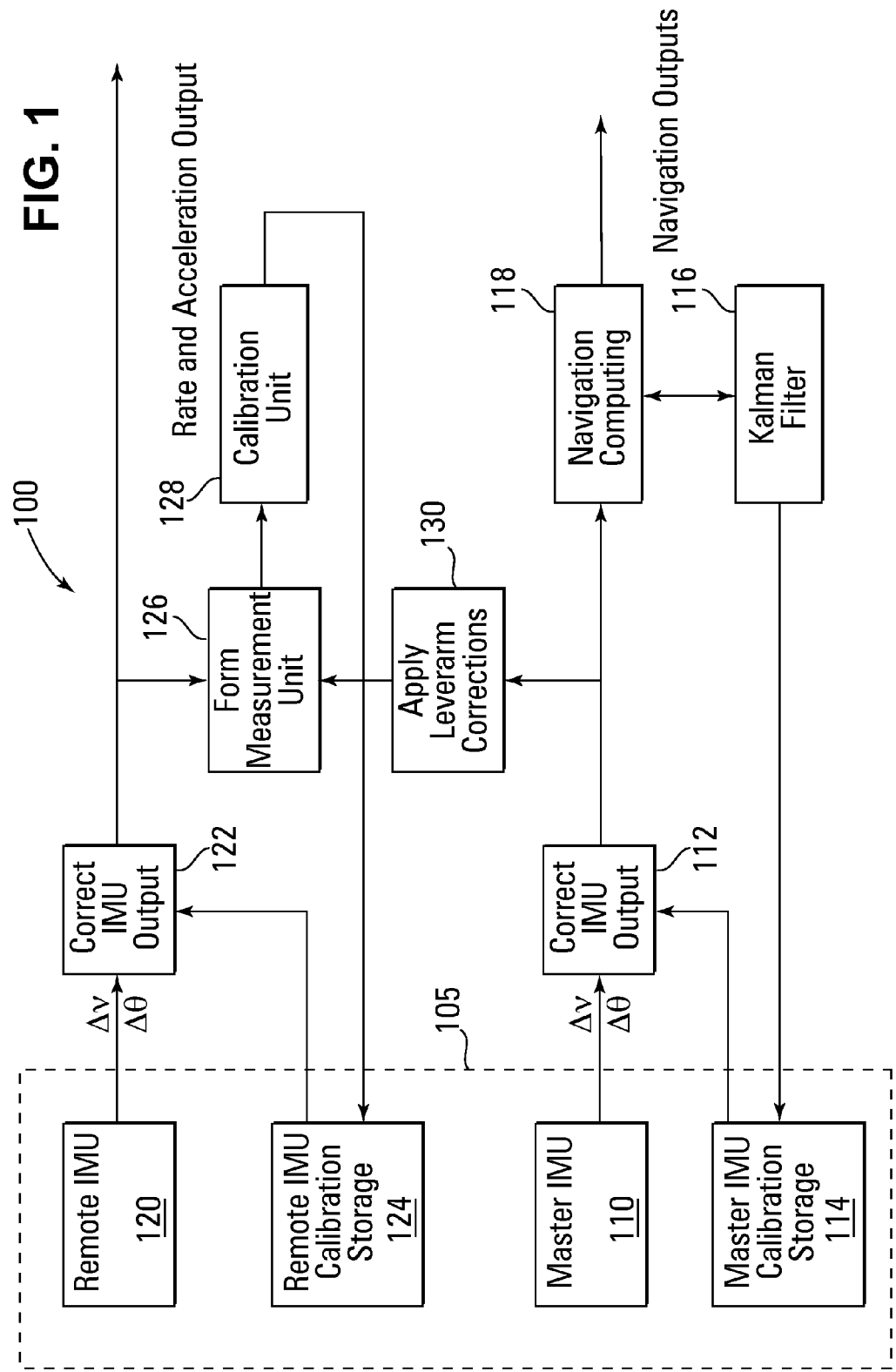

METHOD AND SYSTEM FOR ESTIMATION OF INERTIAL SENSOR ERRORS IN REMOTE INERTIAL MEASUREMENT UNIT

BACKGROUND

Inertial navigation systems are used in civil and military aviation, missiles and other projectiles, submarines and other underwater vehicles, space vehicles, as well as in numerous other vehicle applications. A typical inertial navigation system (INS) includes an inertial measurement unit (IMU) combined with computer control mechanisms, allowing the path of a vehicle to be controlled. An IMU includes inertial sensors or instruments such as accelerometers and/or gyroscopes for detecting and measuring inertial motion and acceleration in multiple directions.

Navigation systems usually model instrument errors and as such can track any long term drift in the instruments characteristics. On IMUs that may not be tied to any navigation, but only generate rates and acceleration, there is no navigation error model of the instruments that can be used to eliminate any long term drift. In order to overcome bias shifts resulting from aging in the environment, many inertial sensors employ a sensor model and calibration process that is independent of the actual operating environment. Velocity differences and angle differences generated by the inertial sensors are typically processed by a Kalman filter to estimate errors in the IMU including any gyroscope and/or accelerometer bias errors.

In conventional approaches, when multiple IMUs are used on a single platform such as an aircraft, each IMU has navigation mechanizations and Kalman filters that are used to transfer align to a master navigation system. During this process, the instrument errors of the respective IMUs are estimated as part of the transfer alignment Kalman filter. Providing each IMU with it own sensor model and calibration process is complex and costly when the IMU is not used as a navigation system, but only for rates and accelerations for a flight control system.

Accordingly, there is a need for improved inertial sensor calibration techniques that overcome the above deficiencies.

SUMMARY

The present invention is related to a method and system for estimation of inertial sensor errors. The method includes receiving first inertial output data from a master inertial measurement unit (IMU) mounted on a host platform, with the first inertial output data comprising a change in velocity (delta V) and a change in angle (delta theta), and receiving second inertial output data from a remote IMU mounted on the host platform at a predetermined fixed distance from the master IMU, with the second inertial output data comprising a delta V and a delta theta. The first inertial output data is compared with the second inertial output data to determine a difference between the delta V of the first inertial output data and the delta V of the second inertial output data, and to determine a difference between the delta theta of the first inertial output data and the delta theta of the second inertial output data. The determined differences between the delta V of the first inertial output data and the delta V of the second inertial output data, and between the delta theta of the first inertial output data and the delta theta of the second inertial output data, are applied to estimate inertial sensor errors in the remote IMU.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which:

FIG. 1 is a block diagram of a system for inertial sensor calibration according to one embodiment of the invention.

DETAILED DESCRIPTION

In the following detailed description, embodiments are described in sufficient detail to enable those skilled in the art to practice the invention. It is to be understood that other embodiments may be utilized without departing from the scope of the present invention. The following description is, therefore, not to be taken in a limiting sense.

The present invention is directed to a method and system for estimation of long term turn-on to turn-on inertial sensor errors of an inertial measurement unit (IMU) using the outputs from another calibrated IMU mounted on the same platform. The present invention eliminates the need to generate any navigation data from either IMU, by using the output of the calibrated IMU to determine the inertial sensor errors in the other remotely located IMU.

The present method and system are particularly applicable to remote IMUs with large turn-on errors. In the present approach, the calibrated IMU is used to remove significant turn-on errors, and data processing allows the remote IMU to be easily calibrated. If the remote IMU requires some form of long term continual calibration then this technique carries out the calibration of the remote IMU without the need for the mechanization of navigation solution or a Kalman filter to carry out the transfer alignment.

The present system is configured with at least two IMUs, with a first IMU being a master IMU having a complete navigation system. A Kalman filter in the first IMU estimates sensor errors and generates a long term correction to the sensor errors that eventually reduces or at least maintains the errors to some level of specification. A second IMU is remotely mounted from the first IMU, but still on the same platform such that relative motion between the first and second IMUs is reduced to zero mean structural bending. The two IMUs may also have a boresight error (mounting) difference. In one embodiment, the IMUs can be implemented in the form of microelectromechanical (MEMS) IMUs.

The present method estimates the sensor errors without resorting to the generation of a full-up navigation system. Instead, the method time synchronizes measurements of the IMU outputs of change in velocity (delta V) and change in angle (delta theta) for the two IMUs. The inertial instrument errors from the IMUs can be determined by comparing the delta V and delta theta output data of the two IMUs. This data is processed thru a Kalman filter that has the appropriate error models of the remotely located IMU along with the fixed distance between the two IMUs. The difference between the output data measurements becomes the measurement residual used by the Kalman filter to estimate the relative sensor errors between the master IMU that is calibrated and the remote IMU that has no existing self calibration. Comparison of the delta V and delta theta outputs from the remote IMU and the master IMU eliminates the need for navigation mechanization for the remote IMU. The present approach provides rate and acceleration outputs from the remote IMU that have any long term (e.g., years) error growth removed or significantly reduced.

The present method and system can be employed, for example, in aircraft systems using multiple IMUs for a variety of applications (e.g., navigation, flight control), aircraft avionics, and weapons systems. The present technique allows for lower performance IMUs having a lower cost to be used in aircraft or weapons delivery systems. The present approach can also be employed in low cost weapons, where a single good performance or well calibrated IMU can be used to remove turn-on errors in a separate lower performance IMU located on a weapon in a weapons bay. When the present approach is used for flight control IMUs, the calibration of the remote IMU is done during a start-up operation.

Further details of various aspects of the system and method of the invention are described hereafter with respect to the drawings.

FIG. 1 is a block diagram showing an exemplary system for inertial sensor calibration according to the present invention. The system, indicated generally at 100, includes a master IMU 110 mounted on a host platform 105, and at least one remote IMU 120 mounted on host platform 105 at a fixed distance from IMU 110. One or more additional remote IMUs can be incorporated into system 100 if needed. In one embodiment, relative motion between master IMU 110 and remote IMU 120 comprises zero mean structural bending. The host platform 105 can be an aerial vehicle such as a manned aircraft or unmanned aerial vehicle (UVA), a ground vehicle such as an unmanned ground vehicle, or a remote sensor on a RADAR antenna or other remote sensing devices that require knowledge about the acceleration and attitude of the remote sensor. In one embodiment, IMU 110 and IMU 120 are MEMS IMUs such as three-axis MEMS IMUs.

The IMU 110 and IMU 120 each include one or more inertial sensors, such as one or more accelerometers, one or more gyroscopes, or combinations thereof. The inertial sensors are configured to sense rotational motion of the host platform in one or more dimensions. The accelerometers measure acceleration of the host platform in one or more dimensions. The accelerometers may include, for example, a number of cantilevered beams that can be used to sense acceleration along several orthogonal rate axes. The outputs of the accelerometers are integrated during a sampling period to get velocities, which are differentiated to obtain changes in velocity that are in turn incorporated into the navigation computation. The gyroscopes in the inertial sensors detect inertial motion of the host platform about several orthogonal rate axes. The gyroscopes measure angular velocity of the host platform, which is used by the IMU to generate changes in angle that are incorporated into the navigation computation.

A first error compensation unit 112 is operatively coupled to master IMU 110 and is configured to receive inertial output data comprising a change in velocity (delta V) and a change in angle (delta theta) from master IMU 110. In some embodiments, error compensation unit 112 can run an algorithm or routine that compensates for any errors in the inertial output data using a correction matrix containing various coefficients for reducing bias errors in the inertial sensors due to vibration of the host platform. The error compensation unit 112 may also contain correction coefficients that can compensate for various other errors in the inertial sensors, including for example, any temperature dependent errors of the inertial sensors.

The system 100 also includes a Kalman filter 116 that is configured to transmit navigation correction data to error compensation unit 112. The Kalman filter 116 generally includes a recursive algorithm adapted to compute an estimate of the navigational error produced by master IMU 110 based at least in part on the inertial output data from IMU 110. The navigation correction data may be in the form of state corrections that can be used by error compensation unit 112 to construct a navigation solution that incorporates vibration changes in the environment.

In one embodiment, a navigation error model in Kalman filter 116 can be configured to predict a navigation error estimate that can be compared with actual measurement data to form a measurement residual. The measurement residual reflects the discrepancy between the navigational error estimates produced by the navigation error model and the actual measurement data taken from the IMU 110. The measurement residual can be applied to form model resets. In some embodiments, the model resets can be applied to the navigation error model to modify the Kalman filter's estimate of the navigational error and error model uncertainty. The navigation error estimates produced by the navigation error model can then be fed to control logic which outputs the navigation correction data to error compensation unit 112.

The Kalman filter 116 also uses a model of the remote IMU such that the Kalman filter can propagate the errors and compare the propagated errors to the actual measured errors in the delta V or delta theta output by the IMUs. The model includes states for the instrument errors, such as accelerometer and gyroscope bias, and scale factors along with states that estimate the small angle mounting error between the two IMUs. The delta V sum measurements are corrected for the distance between the master IMU and the remote IMU by the Kalman filter. The direct use of the IMU delta V and delta theta outputs eliminate the generation of a navigation solution and the transfer align Kalman filter.

A navigation computing unit 118 is in operative communication with Kalman filter 116 and is configured to receive corrected inertial output data from error compensation unit 112. The navigation computing unit 118 is configured to integrate the angular rate output from the inertial sensors and output a navigation position signal containing a measurement of the heading and level attitude (e.g., pitch and roll). The position signal may include, for example, the path heading, distance traveled, velocity output, and the attitude describing the orientation of the host platform in space. The navigation computing unit 118 can also provide various state and dynamics information to Kalman filter 116, including confidence intervals describing the accuracy of IMU 110.

The system 100 can further include a first calibration storage device 114 for master IMU 110, such as a conventional data storage memory, which can store navigation correction data from Kalman filter 116. Such stored navigation correction data can be outputted directly to error compensation unit 112 when needed. The storage device 114 may be integrated as part of IMU 110 or can be physically separated from IMU 110.

A second error compensation unit 122 is operatively coupled to remote IMU 120 and is configured to receive inertial output data comprising a delta V and a delta theta from remote IMU 120. The second error compensation unit 122 performs similar functions as error compensation unit 112. The second error compensation unit 122 outputs rate and acceleration data.

A form measurement unit 126 is operatively coupled to error compensation unit 122 and is configured to receive corrected inertial output data from error compensation unit 122. The form measurement unit 126 provides the function of collecting and comparing the delta V and delta theta outputs from the two IMUs 110 and 120.

A calibration unit 128 is operatively coupled to form measurement unit 126 and is configured to receive measurement data from measurement unit 126. The calibration unit 128 provides the function of estimating the inertial instrument errors present in IMU 120 and supplying the correction to a second calibration storage device 124 for eventual use by error compensation unit 122. Stored calibration data can be outputted to error compensation unit 122 from calibration storage device 124 when needed. The calibration storage device 124 may be integrated as part of IMU 120 or can be physically separated from IMU 120.

A lever arm correction unit 130 is operatively coupled to error compensation unit 112 and form measurement unit 126. The lever arm correction unit 130 is configured to receive corrected inertial output data from error compensation unit 112 and performs the function of translating the outputs of IMU 110 to the location of IMU 120.

During operation of system 100, the delta V from master IMU 110 is time synchronized with the delta V from remote IMU 120, and the delta theta from master IMU 110 is time synchronized with the delta theta from remote IMU 120. The inertial output data from master IMU 110 is then compared with the inertial output data from remote IMU 120 to determine a difference between the delta V from master IMU 110 and the delta V from remote IMU 120, and to determine a difference between the delta theta from master IMU 110 and the delta theta from remote IMU 120. This comparison function takes place in form measurement unit 126, and the determined differences are then sent to calibration unit 128.

The determined difference between the delta V from master IMU 110 and that of remote IMU 120, and the determined difference between the delta theta from master IMU 110 and that of the remote IMU 120 are applied to estimate inertial sensor errors in remote IMU 120 in order to calibrate remote IMU 120. The determined differences between the delta V from master IMU 110 and that of remote IMU 120, and between the delta theta from master IMU 110 and that of remote IMU 120, comprise measurement residual values used by Kalman filter 116 to estimate relative sensor errors between master IMU 110 and remote IMU 120.

Instructions for carrying out the various process tasks, calculations, and generation of signals and other data used in the operation of the system and method of the invention can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs) or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented by computer executable instructions, such as program modules, which are executed by a processor. Generally, program modules include routines, programs, objects, data components, data structures, algorithms, etc. that perform particular tasks or implement particular abstract data types. Computer executable instructions, associated data structures, and program modules represent examples of program code means for executing steps of the methods disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for estimation of inertial sensor errors, the method comprising:
receiving first inertial output data from a master inertial measurement unit (IMU) mounted on a host platform, the first inertial output data comprising a change in velocity (delta V) and a change in angle (delta theta);
receiving second inertial output data from a remote IMU mounted on the host platform at a predetermined fixed distance from the master IMU, the second inertial output data comprising a delta V and a delta theta;
comparing the first inertial output data with the second inertial output data to determine a difference between the delta V of the first inertial output data and the delta V of the second inertial output data, and to determine a difference between the delta theta of the first inertial output data and the delta theta of the second inertial output data; and
applying the determined differences between the delta V of the first inertial output data and the delta V of the second inertial output data, and between the delta theta of the first inertial output data and the delta theta of the second inertial output data, to estimate inertial sensor errors in the remote IMU.

2. The method of claim 1, wherein the host platform comprises an aerial vehicle or a ground vehicle.

3. The method of claim 1, wherein the master IMU and the remote IMU each comprise one or more inertial sensors.

4. The method of claim 3, wherein the inertial sensors comprise one or more accelerometers, one or more gyroscopes, or combinations thereof.

5. The method of claim 1, wherein the master IMU and the remote IMU each comprise a microelectromechanical systems (MEMS) IMU.

6. The method of claim 1, wherein relative motion between the master IMU and the remote IMU comprises zero mean structural bending.

7. The method of claim 1, wherein the delta V of the first inertial output data is time synchronized with the delta V of the second inertial output data, and the delta theta of the first inertial output data is time synchronized with the delta theta of the second inertial output data.

8. The method of claim 1, wherein the determined differences between the delta V of the first inertial output data and the delta V of the second inertial output data, and between the delta theta of the first inertial output data and the delta theta of the second inertial output data, comprise measurement residual values used by a Kalman filter to estimate relative sensor errors between the master IMU and the remote IMU.

9. A computer program product, comprising:
a non-transitory computer readable medium containing instructions stored therein for causing a processor to perform a method for estimation of inertial sensor errors, the method comprising:
  receiving first inertial output data from a master inertial measurement unit (IMU) mounted on a host platform, the first inertial output data comprising a change in velocity (delta V) and a change in angle (delta theta);
  receiving second inertial output data from a remote IMU mounted on the host platform at a predetermined fixed distance from the master IMU, the second inertial output data comprising a delta V and a delta theta;
  comparing the first inertial output data with the second inertial output data to determine a difference between the delta V of the first inertial output data and the delta V of the second inertial output data, and to determine a difference between the delta theta of the first inertial output data and the delta theta of the second inertial output data; and
  applying the determined differences between the delta V of the first inertial output data and the delta V of the second inertial output data, and between the delta theta of the first inertial output data and the delta theta of the second inertial output data, to estimate inertial sensor errors in the remote IMU.

10. An inertial sensor calibration system, comprising:
a master inertial measurement unit (IMU) mounted on a host platform;
a first error compensation unit operatively coupled to the master IMU and configured to receive inertial output data comprising a change in velocity (delta V) and a change in angle (delta theta) from the master IMU;
a Kalman filter configured to transmit navigation correction data to the first error compensation unit;
a navigation computing unit in operative communication with the Kalman filter and configured to receive corrected inertial output data from the first error compensation unit;
a remote IMU mounted on the host platform at a fixed distance from the master IMU;
a second error compensation unit operatively coupled to the remote IMU and configured to receive inertial output data comprising a delta V and a delta theta from the remote IMU;
a form measurement unit operatively coupled to the second error compensation unit and configured to receive corrected inertial output data from the first and second error compensation units; and
a calibration unit operatively coupled to the form measurement unit and configured to transmit calibration data to the second error compensation unit;
wherein inertial output data from the master IMU is compared with inertial output data from the remote IMU to determine a difference between the delta V from the master IMU and the delta V from the remote IMU, and to determine a difference between the delta theta from the master IMU and the delta theta from the remote IMU;
wherein the determined differences between the delta V from the master IMU and that of the remote IMU, and between the delta theta from the master IMU and that of the remote IMU are applied to estimate inertial sensor errors in the remote IMU.

11. The system of claim 10, wherein the host platform comprises an aerial vehicle or a ground vehicle.

12. The system of claim 10, wherein the master IMU and the remote IMU each comprise one or more inertial sensors.

13. The system of claim 12, wherein the inertial sensors comprise one or more accelerometers, one or more gyroscopes, or combinations thereof.

14. The system of claim 10, wherein the master IMU and the remote IMU each comprise a MEMS IMU.

15. The system of claim 10, wherein relative motion between the master IMU and the remote IMU comprises zero mean structural bending.

16. The system of claim 10, further comprising a first calibration storage device for the master IMU.

17. The system of claim 10, further comprising a second calibration storage device for the remote IMU.

18. The system of claim 10, further comprising a lever arm correction unit operatively coupled to the first error compensation unit and the form measurement unit.

19. The system of claim 10, wherein the delta V from the master IMU is time synchronized with the delta V from the remote IMU, and the delta theta from the master IMU is time synchronized with the delta theta from the remote IMU.

20. The system of claim 10, wherein the determined differences between the delta V from the master IMU and that of remote IMU, and between the delta theta from the master IMU and that of the remote IMU, comprise measurement residual values used by the Kalman filter to estimate relative sensor errors between the master IMU and the remote IMU.

* * * * *